(12) United States Patent
Hunt et al.

(10) Patent No.: US 10,282,859 B2
(45) Date of Patent: May 7, 2019

(54) INTRA-SENSOR RELATIVE POSITIONING

(71) Applicant: The Boeing Company, Chicago, IL (US)

(72) Inventors: Jeffrey H. Hunt, Thousand Oaks, CA (US); Michael M. Vander Wel, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 204 days.

(21) Appl. No.: 15/375,921

(22) Filed: Dec. 12, 2016

(65) Prior Publication Data
US 2018/0165826 A1 Jun. 14, 2018

(51) Int. Cl.
| G06T 7/70 | (2017.01) |
| H04N 7/18 | (2006.01) |
| G01S 17/42 | (2006.01) |
| G01S 17/87 | (2006.01) |
| G01S 17/89 | (2006.01) |
| G01S 7/497 | (2006.01) |

(52) U.S. Cl.
CPC ............... *G06T 7/70* (2017.01); *G01S 7/497* (2013.01); *G01S 17/42* (2013.01); *G01S 17/87* (2013.01); *G01S 17/89* (2013.01); *H04N 7/181* (2013.01)

(58) Field of Classification Search
CPC ............ G06T 7/70; G01S 17/42; H04N 7/181
USPC ....................................................... 348/159
See application file for complete search history.

(56) References Cited

U.S. PATENT DOCUMENTS

| 9,013,543 B1* | 4/2015 | Furukawa ........... H04N 5/23238 348/36 |
| 9,715,738 B2* | 7/2017 | Arai ...................... G06F 3/0425 |
| 9,984,572 B1* | 5/2018 | Newman ................ G08G 1/141 |
| 2002/0060784 A1* | 5/2002 | Pack ...................... G01S 7/481 356/6 |
| 2003/0069668 A1* | 4/2003 | Zurn ..................... E01C 19/006 700/245 |
| 2007/0109527 A1* | 5/2007 | Wenstrand ........... G01S 15/876 356/3.1 |
| 2008/0165252 A1* | 7/2008 | Kamimura ............. H04N 7/181 348/155 |
| 2009/0262974 A1 | 10/2009 | Lithopoulos |

(Continued)

OTHER PUBLICATIONS

European Search Report prepared by the European Patent Office in application No. EP 17 19 8977 dated Apr. 26, 2018.

*Primary Examiner* — Zaihan Jiang
(74) *Attorney, Agent, or Firm* — McDonnell Boehnen Hulbert & Berghoff LLP

(57) ABSTRACT

An example system for determining relative position information includes a plurality of positioning devices for determining relative position data within a three-dimensional space, each positioning device having a line of sight. The relative position data determined via each positioning device includes relative position data with respect to the positioning device for each other positioning device within its line of sight. The system further includes a plurality of imaging devices for obtaining image data of an object within the three-dimensional space. The system also includes a computing device configured to correlate the relative position data determined via the plurality of positioning devices and the image data obtained via the plurality of imaging devices, to thereby determine relative position information corresponding to the object within the three-dimensional space.

20 Claims, 8 Drawing Sheets

(56) References Cited

U.S. PATENT DOCUMENTS

| | | | |
|---|---|---|---|
| 2010/0049354 A1 | 2/2010 | Stark et al. | |
| 2010/0106285 A1* | 4/2010 | Massey | B23K 9/16 |
| | | | 700/212 |
| 2015/0092226 A1* | 4/2015 | Anderson | H04N 1/00323 |
| | | | 358/1.15 |
| 2015/0356739 A1* | 12/2015 | Masuda | G01C 11/06 |
| | | | 348/47 |
| 2016/0088284 A1* | 3/2016 | Sareen | G06N 3/006 |
| | | | 348/47 |
| 2016/0163283 A1* | 6/2016 | Chang | G06T 7/73 |
| | | | 345/633 |
| 2018/0108179 A1* | 4/2018 | Tomlin | G02B 27/0172 |

* cited by examiner

INTRA-SENSOR RELATIVE POSITIONING

FIELD

The present disclosure generally relates to measurement and positioning systems within a three-dimensional space.

BACKGROUND

There are many efforts presently to use multiple sensors such as cameras or other imaging devices in a given space to provide real-time situational awareness and measurement data within the space. In general, a fixed reference point or benchmark is used to locate the cameras within the space, and thereby provide a basis to determine positioning information for the image data obtained by the cameras.

However, in some large-scale factory settings, the structure of the factory itself may not be sufficiently stationary to provide a reliable reference point for image data that is obtained within. For instance, temperature changes may lead to thermal expansion or contraction of the structure. In some geographic locations, movement of the tides may cause movements of the structure in coastally located buildings. Strong winds and other weather-related conditions may have a similar result. Because of these effects, cameras that are mounted within the space may move relative to any reference point within the space that is chosen. This may cause the image data obtained by the cameras to drift, and any positioning information determined therefrom may become inaccurate. Moreover, in some manufacturing applications, such as the tooling and assembly processes associated with an aircraft, measurement tolerances can be extremely low. Therefore, any metrology system that is used should be correspondingly accurate.

What is needed is a system that can determine position information within a three-dimensional space without the need for a fixed reference point or benchmark.

SUMMARY

In one example, a system for determining relative position information is described including a plurality of positioning devices for determining relative position data within a three-dimensional space, each positioning device having a line of sight, and where the relative position data determined via each positioning device includes relative position data with respect to the positioning device for each other positioning device within its line of sight. The system further includes a plurality of imaging devices for obtaining image data of an object within the three-dimensional space, and a computing device configured to correlate the relative position data determined via the plurality of positioning devices and the image data obtained via the plurality of imaging devices to thereby determine relative position information corresponding to the object within the three-dimensional space In another example, a method is described. The method includes determining, via a plurality of positioning devices, relative position data within a three-dimensional space, each positioning device having a line of sight, and where the relative position data determined via each positioning device includes relative position data with respect to the position data for each other positioning device within its line of sight. The method also includes obtaining, via a plurality of imaging devices, image data of an object within the three dimensional space, and correlating, by a computing device, the relative position data determined via the plurality of positioning devices and the image data obtained via the plurality of imaging devices. The method also includes, based on the correlation of the relative position data determined via the plurality of positioning devices and the image data obtained via the plurality of imaging devices, determining, by the computing device, relative position information corresponding to the object within the three-dimensional space.

In still another example, a non-transitory computer readable medium is described. The non-transitory computer readable medium has instructions stored thereon, that when executed by a computing device, cause the computing device to perform functions including determining, via a plurality of positioning devices, relative position data within a three-dimensional space, each positioning device having a line of sight, and where the relative position data determined via each positioning device includes relative position data with respect to the positioning device for each other positioning device within its line of sight. The instructions also include obtaining, via a plurality of imaging devices, image data of an object within the three dimensional space, and correlating the relative position data determined via the plurality of positioning devices and the image data obtained via the plurality of imaging devices. The instructions further include, based on the correlation of the relative position data determined via the plurality of positioning devices and the image data obtained via the plurality of imaging devices, determining relative position information corresponding to the object within the three-dimensional space.

The features, functions, and advantages that have been discussed can be achieved independently in various embodiments or may be combined in yet other embodiments, further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying Figures.

DETAILED DESCRIPTION

Disclosed embodiments will now be described more fully with reference to the accompanying Figures, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

Examples discussed herein include a system for determining relative position information within a three-dimensional space. The system includes a plurality of positioning devices, each determining the position of the other positioning devices, relative to itself, that are within its line of sight. The system also includes a plurality of imaging devices that obtain image data corresponding to an object within the three-dimensional space, such as aircraft components in an assembly space such as a warehouse or hangar. The imaging devices may be coupled to, or mounted independently from, the positioning devices. A computing device correlates the relative position data with the image data to thereby determine relative position information corresponding to the object.

In this arrangement, the system might not determine an absolute position for any of the positioning or imaging devices within the three-dimensional space. Rather, the system determines the relative positions of the devices with respect to each other. If there is a movement of one of the devices, based on environmental or other causes, the relative positions determined by the system will change. However, because there are multiple measurements for each device, the geometry of the system is mathematically over-constrained. Therefore, it may be possible to determine, via calculation, which device has moved, and to what extent. Once the movements have been calculated and ascertained, the measurements and situational awareness provided by the system can be recalibrated and re-normalized to the new relative positions of the positioning and imaging devices.

By the term "about" or "substantially" or "approximately" with reference to amounts or measurement values, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect that the characteristic was intended to provide.

Figure 1:
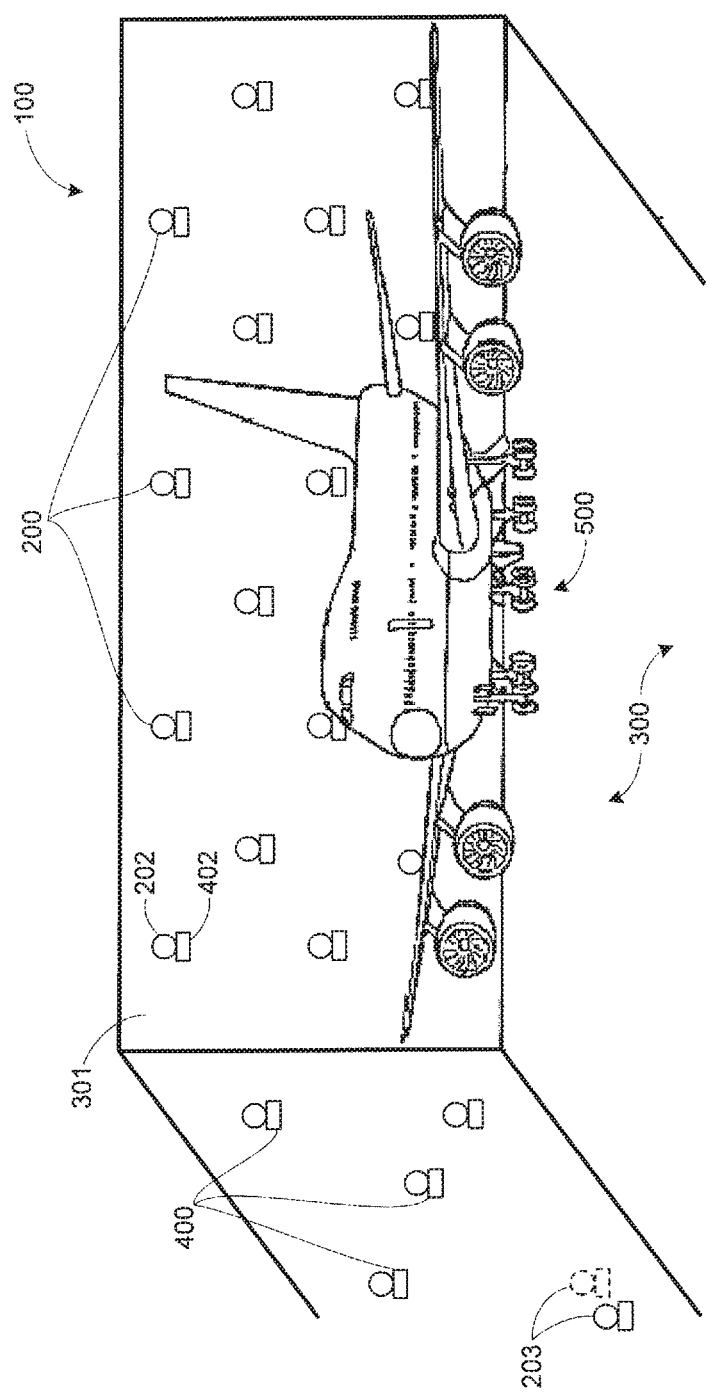
FIG. 1 illustrates an example system for determining relative position information in a three dimensional space, according to an example implementation.

Referring now to FIG. 1, a system 100 for determining relative position information is illustrated. The system 100 includes a plurality of positioning devices 200 for determining relative position data 201 within a three-dimensional space 300. Each positioning device in the plurality of positioning devices 200, individually represented as positioning device 202, by way of example, may be a light imaging, detection, and ranging (LIDAR) device. Accordingly, each positioning device 202 may include a light source such as a laser, and a sensor for detecting light, such as a photodiode. Other positioning devices capable of obtaining point-to-point measurements are also possible.

The three-dimensional space 300 pictured in FIG. 1 is a manufacturing space, used for the manufacture and assembly of an object 500, such as the aircraft depicted in FIG. 1. Other environments and applications, manufacturing and otherwise, are also possible. For clarity, the perspective view shown in FIG. 1 only shows a rear wall and a portion of one sidewall of the three-dimensional space 300. However, the plurality of positioning devices 200 may be distributed throughout the entire three-dimensional space, some of which is not shown in FIG. 1.

Figure 2:
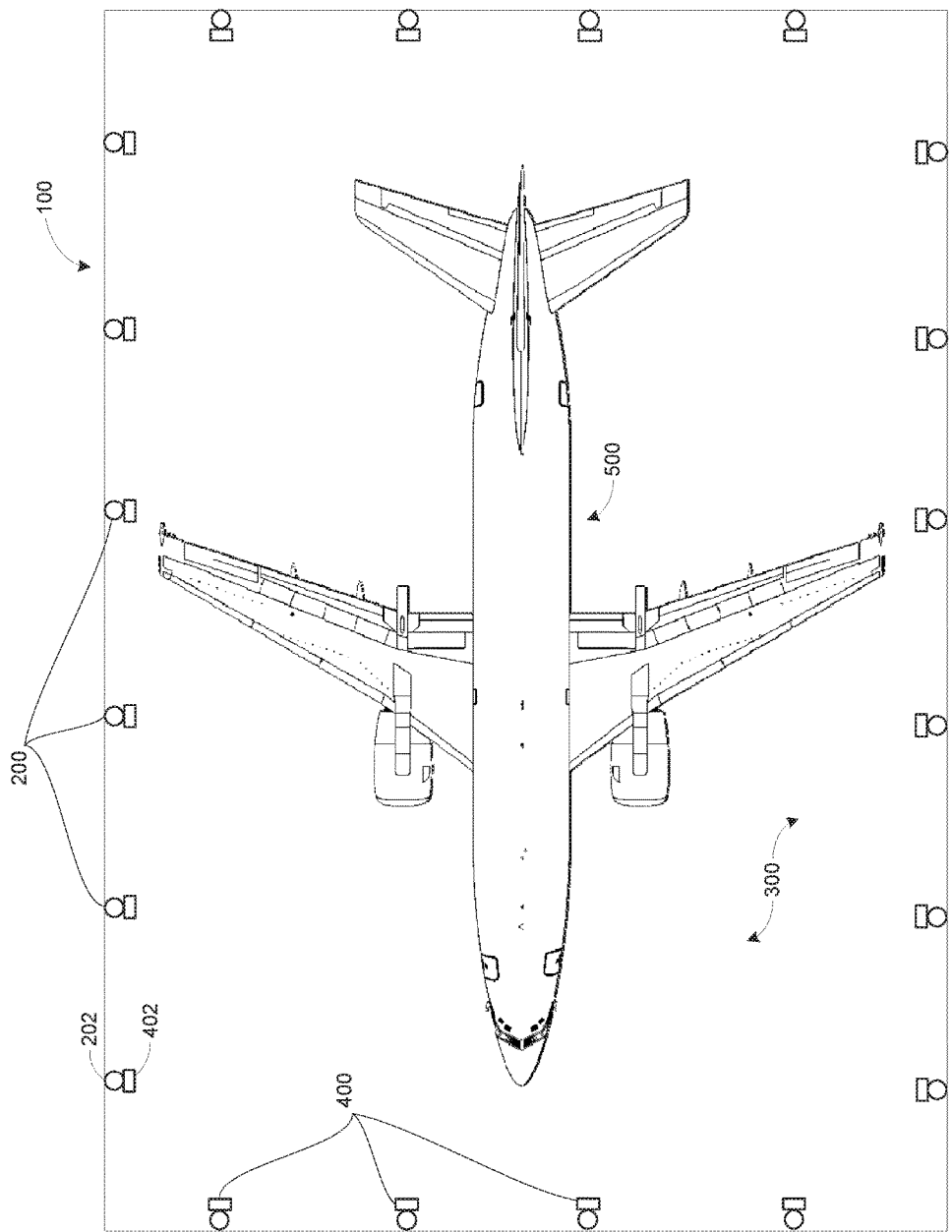
FIG. 2 illustrates another view of an example system for determining relative position information in a three dimensional space, according to an example implementation.

FIG. 2 illustrates another implementation of the system 100, shown from a top view. Again, the three-dimensional space 300 is a manufacturing space used for the manufacture and assembly of an object 500, such as the aircraft shown. Here, the plurality of positioning devices 200 is shown surrounding the three-dimensional space 300. As above, the plurality of positioning devices 200 shown in FIG. 2 may include more devices than those depicted. For example, positioning devices may be mounted at differing vertical elevations throughout the three-dimensional space 300, as shown in FIG. 1.

Each positioning device 202 may be mounted to a structure 301 within the three-dimensional space 300, such as the exterior wall shown in FIGS. 1 and 2. However, each positioning device 202 is not limited to such a location. The positioning devices may be mounted in any number of intermediary positions within the three-dimensional space 300, including on the ceiling, or on the floor. As discussed further below, the number of positioning devices included in the system 100 may be numerous. For example, the plurality of positioning devices 200 may include between twenty and one hundred positioning devices.

Within the three-dimensional space 300, each positioning device 202 may have a line of sight, representing everything that its light source can illuminate. Each positioning device's line of sight may be limited by the manner or location in which it is mounted. Further, obstructions within the manufacturing space may obscure areas that would otherwise be within the positioning device's line of sight. For example, the object 500 may be sufficiently large that positioning devices on opposite sides of the object 500 are blocked from each other's line of sight.

The relative position data 201 determined via each positioning device 202 may include relative position data, with respect to the positioning device 202, for each other positioning device within its line of sight. For example, in a given system 100 where the plurality of positioning devices includes thirty LIDAR devices, each positioning device 202 may measure a relative position for twenty-five other LIDAR devices, assuming some of the other devices are not within its particular line of sight. Conversely, twenty-five other LIDAR devices may each measure a relative position, with respect to itself, for the positioning device 202. Similar data may be determined for each other positioning device as well.

By over-determining the relative position of each positioning device 202, the system 100 may account for movement of one or more positioning devices, even without an absolute reference point on which to base the determination. For instance, as noted above, environmental factors such as temperature, weather, and tidal effects may cause the shape of the three-dimensional space 300 to change, and this in turn may cause a given positioning device 203, as shown in FIG. 1, to move. In some cases, the environmental effects noted above may cause more than one of the positioning devices to move. This may result in cumulative changes in the relative position data 201 that may be difficult to reconcile if the number of positioning devices is relatively small. However, because of the numerosity of the positioning devices, and the resultant redundancy in the relative position data 201, the system 100 may be able to determine which positioning device(s) have moved, and to what extent.

For example, the system 100 may situate each positioning device 202 with (x, y, z) coordinates relative to the other devices. When one or more of the positioning devices moves, the system may utilize one or more algorithms to determine, based on the inter-relation of the positioning devices, which positioning devices are obtaining relative position data that is inconsistent with the rest of the data set. Further, after identifying the given positioning device 203 that has moved, the system 100 may determine how much it has moved based on the determined inconsistency.

The system 100 also includes a plurality of imaging devices 400 for obtaining image data 401 of the object 500 within the three-dimensional space 300. Each imaging device in the plurality of imaging devices 400, individually represented as imaging device 402, by way of example, may be a camera. Other imaging devices, such as laser imaging systems, are also possible.

After the image data 401 is obtained, it may be processed using various image processing techniques in order to obtain measurement data and other real-time information regarding the object 500. However, if one or more of the imaging devices in the plurality of imaging devices 400 moves, it may cause the measurements determined via the obtained image data 401 to become inaccurate. As noted above, environmental factors such as temperature, weather, and tidal effects may cause the shape of the three-dimensional space 300 to change, leading to measurement errors. For example, measurements based on a prior position of a given imaging device may be inconsistent with future measurements.

Figure 6:
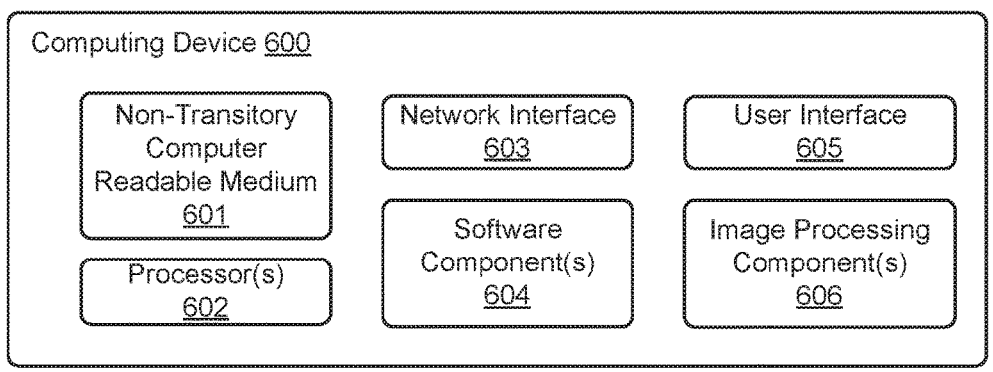
FIG. 6 illustrates an example computing device, according to an example implementation.
Figure 7:
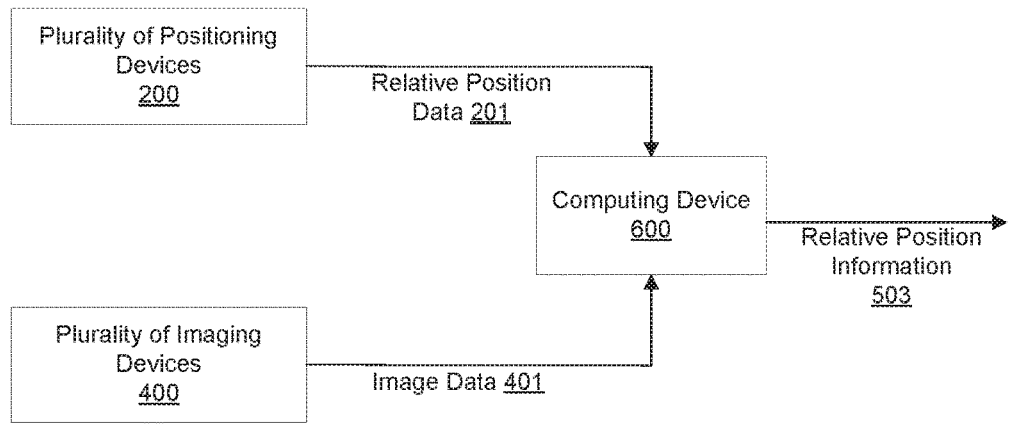
FIG. 7 shows a communications flow diagram according to an example implementation.

Therefore, the system 100 may include a computing device 600, such as the computing device shown in FIG. 6, configured to correlate the relative position data 201 determined via the plurality of positioning devices 200 and the image data 401 obtained via the plurality of imaging devices 400 to thereby determine relative position information 503 corresponding to the object 500 within the three-dimensional space 300. An illustration of this data communication is shown in FIG. 7, and is discussed further below.

The computing device 600 may correlate the relative position data 201 and the image data 401 in a number of ways. For instance, the computing device 600 may determine, via each positioning device 202, relative position data for each imaging device 402 in the plurality of imaging devices 400. In some implementations, as shown in FIGS. 1 and 2, each imaging device 402 in the plurality of imaging devices 400 may be mounted integrally with one of the positioning devices 202 such that the imaging device 402 is immovable with respect to the positioning device 202. In this arrangement, the relative position of the imaging device 402, as determined via each positioning device 202, is the same as the positioning device to which it is mounted (or effectively the same, notwithstanding the distance between the imaging device's lens and the co-mounted positioning device's photodiode).

With respect to FIGS. 1 and 2, the system 100 may not include an imaging device 402 for every positioning device 202. In general, the number of imaging devices needed to obtain the desired measurement data and other information regarding the object 500 may be dictated by the size and shape of the object 500. Whereas, the number of positioning devices may be based on the degree of redundancy that is needed to obtain accurate measurements.

Figure 3:
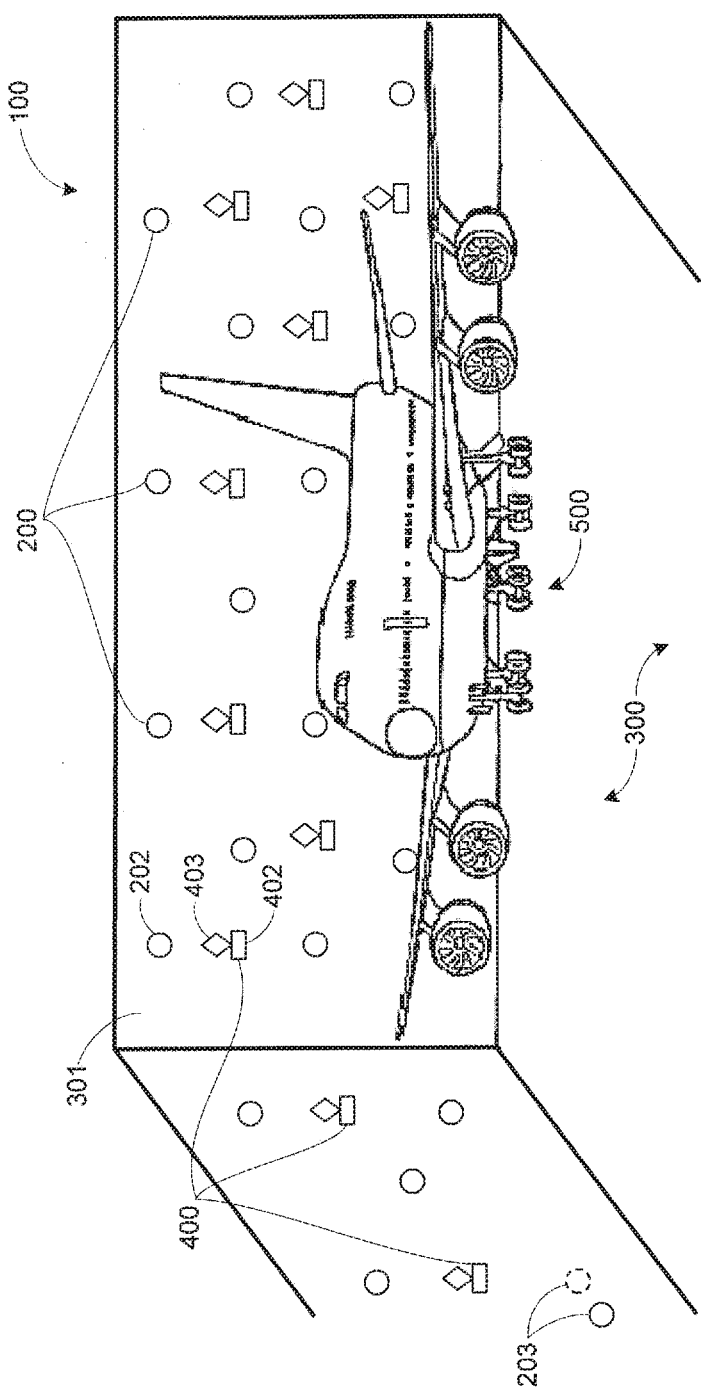
FIG. 3 illustrates another example system for determining relative position information in a three dimensional space, according to an example implementation.

FIG. 3 shows another example implementation in which each imaging device 402 in the plurality of imaging devices 400 includes a location device 403 mounted to the imaging device 402. The location device 403 may be, for example, a retroreflector. This may reflect the emitted light source of each positioning device 202 back to its respective photodiode. Consequently, the relative position data 201 determined via each positioning device 202 includes relative position data with respect to the positioning device 202 for each location device 403 within its line of sight.

Figure 4:
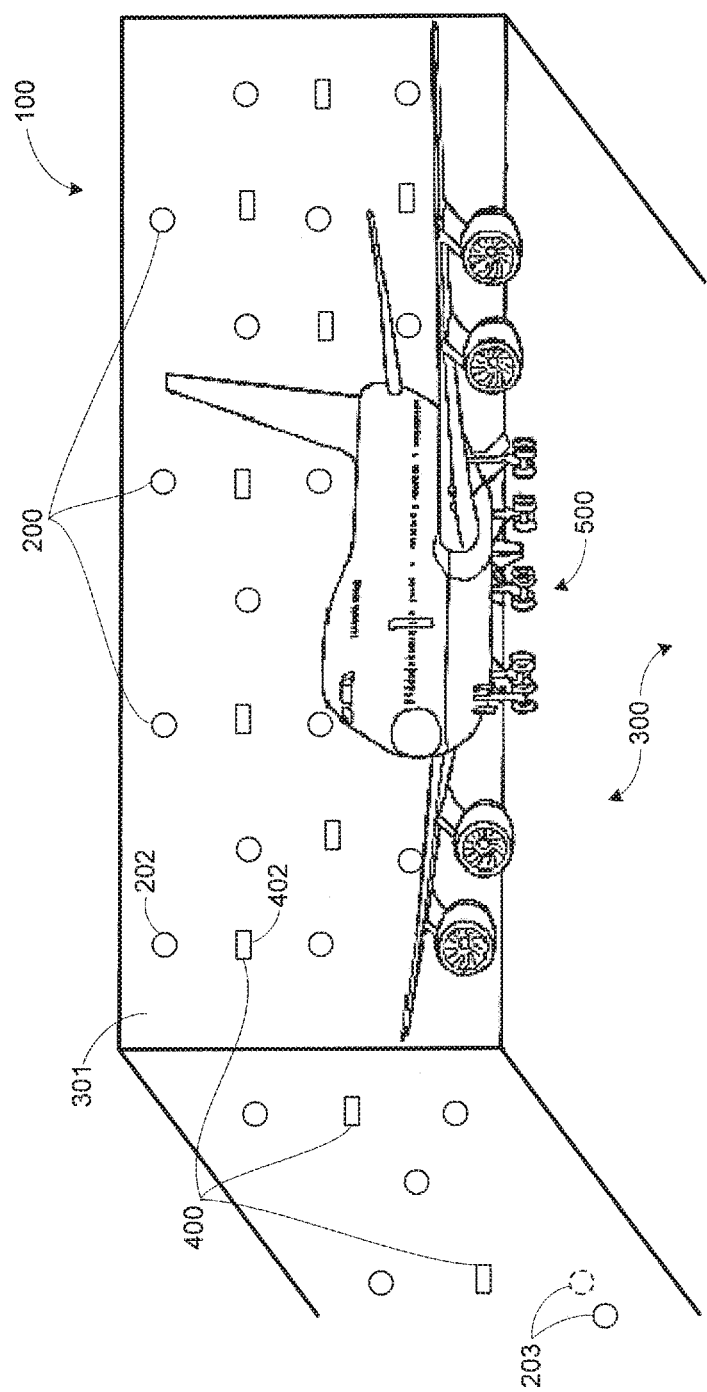
FIG. 4 illustrates another example system for determining relative position information in a three dimensional space, according to an example implementation.

FIG. 4 shows yet another example implementation in which the plurality of imaging devices 400 are uncoupled from the plurality of positioning devices 200. Further, the imaging devices do not include any additional location devices 403 as shown in FIG. 3, and thus the plurality of positioning devices 200 might not obtain relative position data for each imaging device 402. Nonetheless, the computing device 600 may locate the plurality of imaging devices 400 within the three-dimensional space 300. For instance, an arbitrary coordinate system may be established from the relative position data 201 that is determined via the plurality of positioning devices 200.

In this situation, the plurality of imaging devices 400 is not in physical registry with the plurality of positioning devices 200. In other words, although it may be convenient in some applications for the plurality of positioning devices 200 and plurality of imaging devices 400 to be in a geographically co-positioned geometry, the system 100 only requires that they be informationally registered with one another. For example, the computing device 600 may facilitate and coordinate locational signals between the plurality of positioning devices 200 and the plurality of imaging devices 400. In such an example, the plurality of imaging devices 400 need only be in informational contact with signals from the plurality of positioning devices 200. Therefore, the plurality of imaging devices 400 can be positioned in any desired array as is appropriate for the application in question. Even in an implementation where the plurality of imaging devices 400 is co-located with the plurality of positioning devices 200, they may also be informationally connected via some transmitted signal.

FIG. 6 shows the example computing device 600, which may include a non-transitory, computer readable medium 601 configured to store instructions that are executable by one or more processors 602. For instance, the non-transitory, computer readable medium 601 may be data storage that can be loaded with one or more of the software components 604 executable by the processor(s) 602 to achieve certain functions. Image processing component(s) 606 may process the obtained image data 401 to extract the desired information. In some cases, the image processing component(s) may be a sub-component of the processor(s) 602.

The computing device 600 may also include a network interface 603, which may be wired or wireless, and which may facilitate the communication of relative position data 201 and image data 401 to the computing device 600. In this regard, the computing device 600 might not necessarily be embodied by a single device. The computing device 600 may include one or more local devices, such as a networked computer or server, or it may be composed of one or more remote devices, such as a cloud-based server or group of servers. The computing device 600 may also be a combination or local and remote devices.

Finally, the computer device 600 may include a user interface 605 for inputting commands, interacting with the relative position data 201 and image data 401, or outputting the relative position information 503 regarding the object 500.

Figure 5:
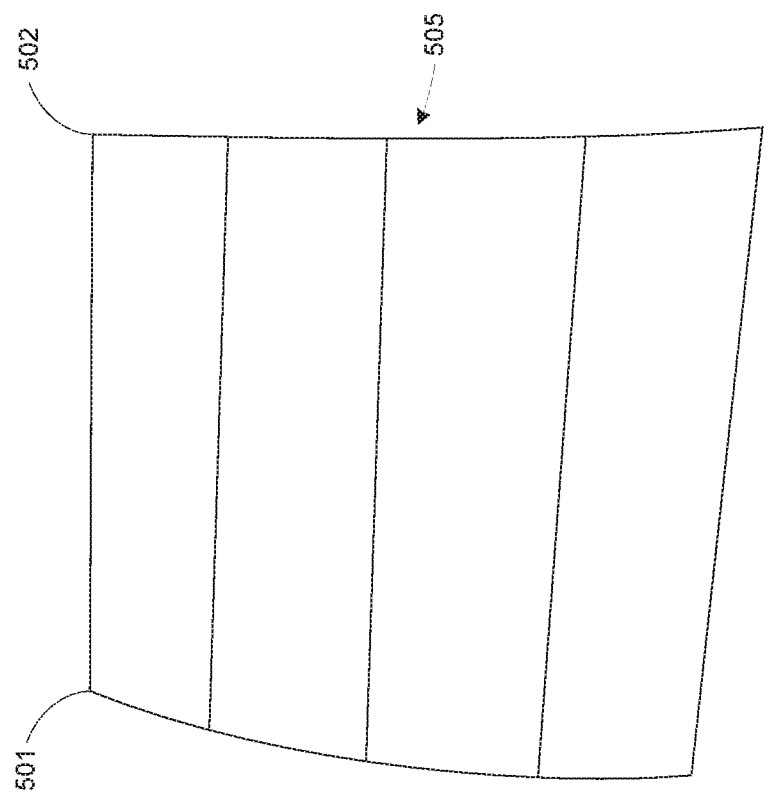
FIG. 5 illustrates a first and second target point on an object, according to an example implementation.

The relative position information determined by the computing device 600 may take a number of forms. For instance, the image data 401 obtained via the plurality of imaging devices 400 may include image data for a first target point 501 on the object 500 and a second target point 502 on the object 500. An example in shown in FIG. 5, which illustrates a section of fuselage 505 from the overall object 500. The first target point 501 corresponds to the top left corner of the section of fuselage 505. Similarly, the second target point 502 corresponds to the top right corner of the section of fuselage 505. In this example, the determined relative position information 503 corresponding to the object 500 may include relative position information for the first target point 501 with respect to the second target point 502. This yields a measurement for the width of the section of fuselage 505. The relative position information 503 may include other information as well, and may be used for any number gauging or measurement inquiries regarding the object 500.

Moreover, the computing device may update the relative position information 503 based on a movement of one of the positioning devices or imaging devices. For instance, based on a movement of the given positioning device 203, as shown in FIGS. 1, 3 and 4, the computing device 600 may be configured to determine, via each other positioning device within the line of sight of the given positioning device 203, updated relative position data 204 for the given positioning device 203 with respect to the other positioning device. The computing device 600 may further be configured to correlate the updated relative position data 204 and the image data 401, as discussed above, to thereby determine updated relative position information 504 corresponding to the object 500 within the three-dimensional space 300.

FIG. 7 shows a communications flow diagram according to an example implementation. The computing device 600 receives the relative position data 201 from the plurality of positioning device 200 and the image data 401 from the plurality of imaging devices 400. The computing device 600 correlates the data to thereby determine relative position information 503 corresponding to the object 500. As noted above, the relative position information 503 may be output to a user interface 605. In other examples, the relative position information 503 may be used for further processing. Other examples also exist.

Figure 8:
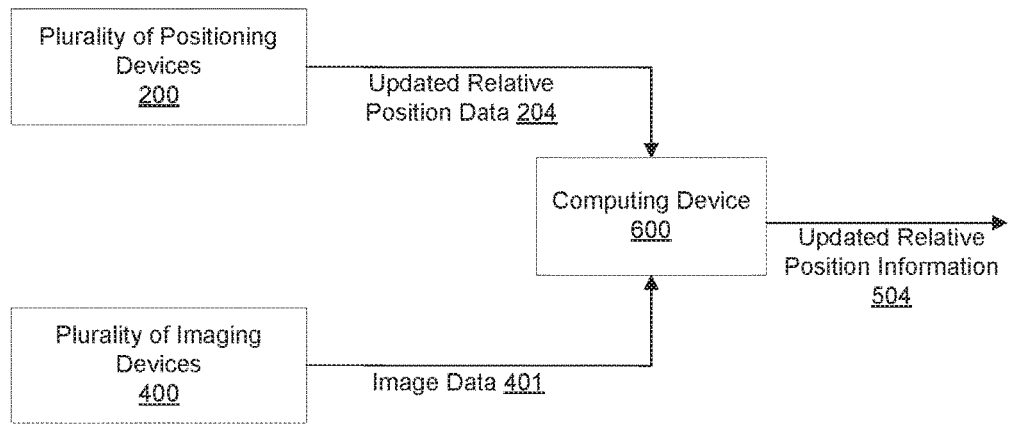
FIG. 8 shows another communications flow diagram according to an example implementation.

FIG. 8 shows a similar communications flow diagram, and reflects the updates that may occur when one or more of the positioning devices moves. In particular, the computing device 600 receives updated relative position data 204 from the plurality of positioning devices 200. This data is correlated with the image data 401, and the computing device 600 thereby determines updated relative position information 504 corresponding to the object 500. Further, the example shown in FIG. 8 also contemplates, either alternatively or additionally, that one of the imaging devices may also move, as depicted in FIG. 1. In this case, the computing device 600 would receive updated image data from the plurality of imaging device 400, and determine the updated relative position information accordingly.

Figure 9:
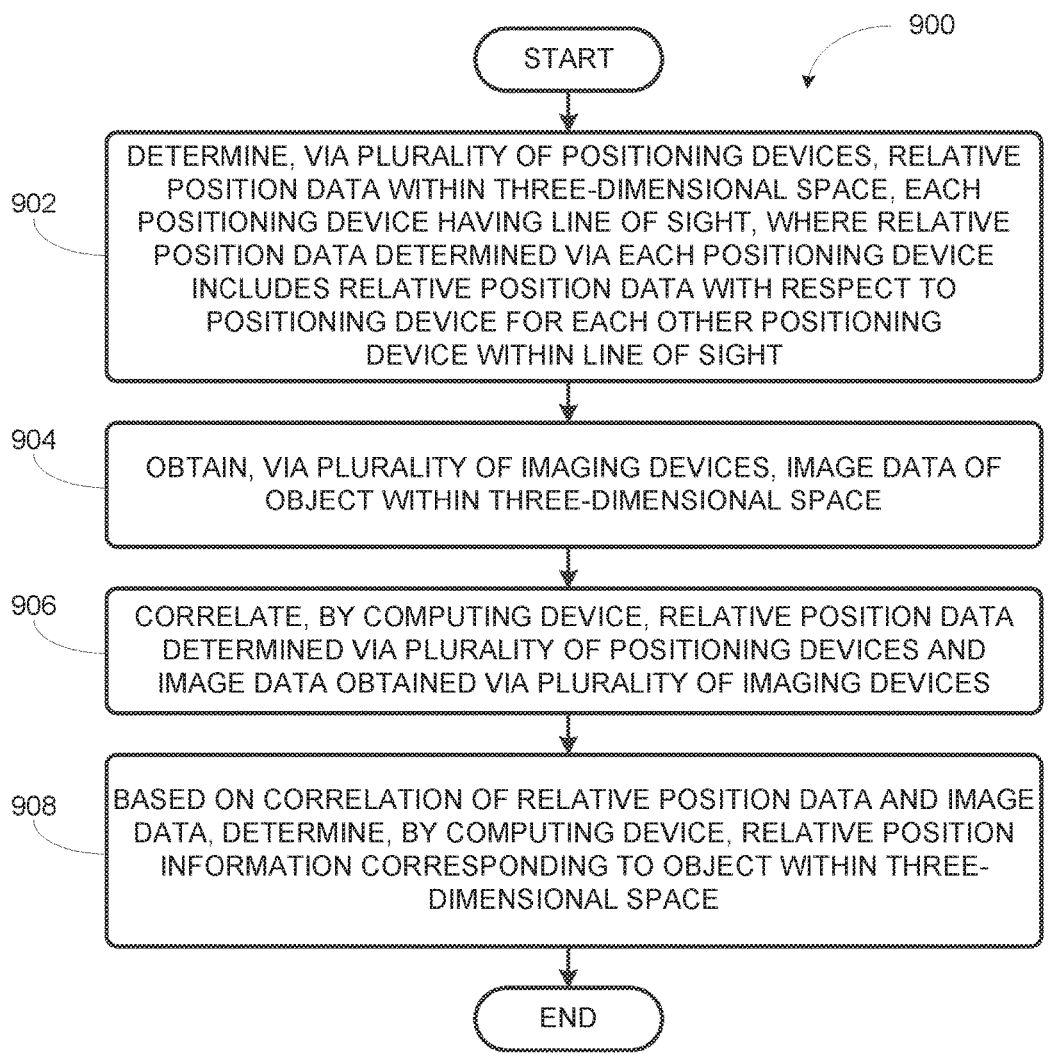
FIG. 9 shows a flowchart of an example method for determining relative position information within a three-dimensional space.

FIG. 9 shows a flowchart of an example method 900 for determining relative position information in a three-dimensional space, according to an example implementation. Method 900 shown in FIG. 9 presents an embodiment of a method that, for example, could be used with the system 100 as shown in FIGS. 1-8 and discussed herein. It should be understood that for this and other processes and methods disclosed herein, flowcharts show functionality and operation of one possible implementation of present embodiments. In this regard, each block in the flowchart may represent a module, a segment, or a portion of program code, which includes one or more instructions executable by a processor for implementing specific logical functions or steps in the process. Alternative implementations are included within the scope of the example embodiments of the present disclosure, in which functions may be executed out of order from that shown or discussed, including substantially concurrent or in reverse order, depending on the functionality involved, as would be understood by those reasonably skilled in the art.

At block 902, the method 900 includes determining, via a plurality of positioning devices 200, relative position data 201 within a three-dimensional space 300. Each positioning device, individually represented as positioning device 202, by way of example, may have a line of sight, as discussed above. Further, the relative position data 201 determined via each positioning device 202 includes relative position data with respect to the positioning device 202 for each other positioning device within its line of sight.

As noted above, the implementations described herein may involve a relatively large number of positioning devices, to provide for redundancy of measurement. Thus, determining the relative position data 201 within the three-dimensional space 300 may involve determining, via between 20 and 100 positioning devices, relative position data 201 within the three-dimensional space 300.

At block 904, the method 900 includes obtaining, via a plurality of imaging devices 400, image data 401 of an object 500 within the three dimensional space 300. In some examples, as shown in the implementations shown in FIGS. 1-3 and discussed above, determining, via each positioning device 202, the relative position data 201 may include determining relative position data with respect to the positioning device 202 for each imaging device 402 within its line of sight.

The relative position data for each imaging device 402 may be determined in various ways. For example, the method 900 may include mounting each imaging device 402 in the plurality of imaging devices 400 integrally with one of the positioning devices 202 such that the imaging device 402 is immovable with respect to the positioning device 202.

In another implementation, each imaging device 402 may include a location device 403 mounted to the imaging device 402, as detailed above. In this case, determining, via each positioning device 202, the relative position data 201 includes determining relative position data with respect to the positioning device 202 for each location device 403 within its line of sight.

At block 906, the method 900 includes correlating, by a computing device 600, the relative position data 201 determined via the plurality of positioning devices 200 and the image data 401 obtained via the plurality of imaging devices 400.

At block 908, based on the correlation of the relative position data determined via the plurality of positioning devices and the image data obtained via the plurality of imaging devices, determining, by the computing device, relative position information corresponding to the object within the three-dimensional space As discussed above and as shown in FIG. 5, the image data 401 obtained via the plurality of imaging devices 400 may include image data for a first target point 501 on the object 500 and a second target point 502 on the object 500. Further, determining the relative position information 503 corresponding to the object 500 may include determining relative position information for the first target point 501 with respect to the second target point 502.

Further, the method 900 may include, based on a movement of a given positioning device 203 in the plurality of positioning devices 200, determining, via each other positioning device within the line of sight of the given positioning device 203, updated relative position data 204 for the given positioning device 203 with respect to the other positioning device. In addition, and as noted above, the method may include correlating the updated relative position data 204 determined via each other positioning device and the image data 401 obtained via the plurality of imaging devices 400 and, based on the correlation of the updated relative position data 204 and the image data 401, determining updated relative position information 504 corresponding to the object 500 within the three-dimensional space 300.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

We claim:

1. A system for determining relative position information comprising:
    a plurality of positioning devices for determining relative position data within a three-dimensional space, each positioning device having a line of sight, and wherein the relative position data determined via each positioning device comprises relative position data with respect to the positioning device for each other positioning device within its line of sight;
    a plurality of imaging devices for obtaining image data of an object within the three-dimensional space; and
    a computing device configured to correlate the relative position data determined via the plurality of positioning devices and the image data obtained via the plurality of imaging devices to thereby determine relative position information corresponding to the object within the three-dimensional space, wherein, based on a movement of a given positioning device of the plurality of positioning devices, the computing device is configured to determine, via each other positioning device within the line of sight of the given positioning device, updated relative position data for the given positioning device with respect to the other positioning device.

2. The system of claim 1, wherein each positioning device in the plurality of positioning devices is a light imaging, detection, and ranging (LIDAR) device.

3. The system of claim 1, wherein each positioning device in the plurality of positioning devices is mounted to a structure within the three-dimensional space, and wherein each imaging device in the plurality of imaging devices is mounted integrally with one of the positioning devices in the plurality of positioning devices such that the imaging device is immovable with respect to the positioning device.

4. The system of claim 1, wherein each imaging device in the plurality of imaging devices comprises a location device mounted to the imaging device, and wherein the relative position data determined via each positioning device comprises relative position data with respect to the positioning device for each location device within its line of sight.

5. The system of claim 1, wherein the image data of the object obtained via the plurality of imaging devices comprises image data for a first target point on the object and a second target point on the object, and wherein the determined relative position information corresponding to the object comprises relative position information for the first target point with respect to the second target point.

6. The system of claim 1, wherein the plurality of positioning devices includes between 20 and 100 positioning devices.

7. The system of claim 1 wherein the computing device is further configured to correlate the updated relative position data and the image data obtained via the plurality of imaging devices to thereby determine updated relative position information corresponding to the object within the three-dimensional space.

8. A method comprising:
    determining, via a plurality of positioning devices, relative position data within a three-dimensional space, each positioning device having a line of sight, and wherein the relative position data determined via each positioning device comprises relative position data with respect to the positioning device for each other positioning device within its line of sight;
    obtaining, via a plurality of imaging devices, image data of an object within the three dimensional space;
    correlating, by a computing device, the relative position data determined via the plurality of positioning devices and the image data obtained via the plurality of imaging devices;
    based on the correlation of the relative position data determined via the plurality of positioning devices and the image data obtained via the plurality of imaging devices, determining, by the computing device, relative position information corresponding to the object within the three-dimensional space; and
    based on a movement of a given positioning device in the plurality of positioning devices, determining, via each other positioning device within the line of sight of the given positioning device, updated relative position data for the given positioning device with respect to the other positioning device.

9. The method of claim 8, wherein determining, via each positioning device in the plurality of positioning devices, relative position data within the three-dimensional space further comprises determining relative position data with respect to the positioning device for each imaging device within its line of sight.

10. The method of claim 8, further comprising mounting each imaging device in the plurality of imaging devices integrally with one of the positioning devices in the plurality of positioning devices such that the imaging device is immovable with respect to the positioning device.

11. The method of claim 8, wherein each imaging device in the plurality of imaging devices comprises a location device mounted to the imaging device, and wherein determining, via each positioning device, relative position data within the three-dimensional space further comprises determining relative position data with respect to the positioning device for each location device within its line of sight.

12. The method of claim 8, wherein the image data of the object obtained via the plurality of imaging devices comprises image data for a first target point on the object and a second target point on the object, and wherein determining the relative position information corresponding to the object comprises determining relative position information for the first target point with respect to the second target point.

13. The method of claim 8, wherein determining, via the plurality of positioning devices, relative position data within the three-dimensional space comprises determining, via between 20 and 100 positioning devices, relative position data within the three-dimensional space.

14. The method of claim 8, further comprising:
correlating the updated relative position data determined via each other positioning device and the image data obtained via the plurality of imaging devices; and
based on the correlation of the updated relative position data and the image data obtained by the plurality of imaging devices, determining updated relative position information corresponding to the object within the three-dimensional space.

15. A non-transitory computer readable medium having stored thereon instructions, that when executed by a computing device, cause the computing device to perform functions comprising:
determining, via a plurality of positioning devices, relative position data within a three-dimensional space, each positioning device having a line of sight, and wherein the relative position data determined via each positioning device comprises relative position data with respect to the positioning device for each other positioning device within its line of sight;
obtaining, via a plurality of imaging devices, image data of an object within the three dimensional space;
correlating the relative position data determined via the plurality of positioning devices and the image data obtained via the plurality of imaging devices;
based on the correlation of the relative position data determined via the plurality of positioning devices and the image data obtained via the plurality of imaging devices, determining relative position information corresponding to the object within the three-dimensional space; and
based on a movement of a given positioning device in the plurality of positioning devices, determining, via each other positioning device within the line of sight of the given positioning device, updated relative position data for the given positioning device with respect to the other positioning device.

16. The non-transitory computer readable medium of claim 15, wherein determining, via each positioning device in the plurality of positioning devices, relative position data within the three-dimensional space further comprises determining, via each positioning device, relative position data with respect to the positioning device for each imaging device within its line of sight.

17. The non-transitory computer readable medium of claim 15, wherein each imaging device in the plurality of imaging devices comprises a location device mounted to the imaging device, and wherein determining, via each positioning device in the plurality of positioning device, relative position data within the three-dimensional space further comprises determining relative position data with respect to the positioning device for each location device within its line of sight.

18. The non-transitory computer readable medium of claim 15, wherein the image data of the object obtained via the plurality of imaging devices comprises image data for a first target point on the object and a second target point on the object, and wherein determining the relative position information corresponding to the object comprises determining relative position information for the first target point with respect to the second target point.

19. The non-transitory computer readable medium of claim 15, wherein determining, via the plurality of positioning devices, relative position data within the three-dimensional space comprises causing between 20 and 100 positioning devices to determine relative position data within the three-dimensional space.

20. The non-transitory computer readable medium of claim 15 further comprising instructions, that when executed by the computing device, cause the computing device to perform functions comprising:
correlating the updated relative position data determined via each other positioning device and the image data obtained via the plurality of imaging devices; and
based on the correlation of the updated relative position data and the image data obtained by the plurality of imaging devices, determining updated relative position information corresponding to the object within the three-dimensional space.

* * * * *